United States Patent [19]

Itoh, deceased et al.

[11] Patent Number: 4,849,588

[45] Date of Patent: Jul. 18, 1989

[54] MOTOR-DRIVEN TIME SWITCH

[75] Inventors: Mamoru Itoh, deceased, late of Nagano, Japan, by Eiko Kamijo, legal representative; Yukimori Miyazawa, Nagano, Japan

[73] Assignee: Kabushiki Kaisha Sankyo Seiki Seisakusho, Nagano, Japan

[21] Appl. No.: 156,869

[22] Filed: Feb. 18, 1988

[30] Foreign Application Priority Data

Feb. 18, 1987 [JP] Japan ............................ 62-21400[U]

[51] Int. Cl.[4] ...................... H01H 43/10; H02K 11/00

[52] U.S. Cl. ............................... 200/38 R; 200/38 C; 310/68 R; 310/71; 310/194

[58] Field of Search .............. 200/38 R, 38 B, 38 BA, 200/38 C, 38 CA, 284; 310/71, 194, 68 R

[56] References Cited

U.S. PATENT DOCUMENTS

| | | | |
|---|---|---|---|
| 3,495,111 | 2/1970 | Haydon | 310/71 X |
| 3,727,015 | 4/1973 | Voland et al. | 200/38 R |
| 3,823,280 | 7/1974 | Obermann et al. | 200/38 B |
| 4,250,420 | 2/1981 | Grah et al. | 310/71 X |
| 4,628,592 | 12/1986 | Mahon | 310/71 X |
| 4,636,595 | 1/1987 | Smock et al. | 200/38 R |
| 4,720,646 | 1/1988 | Torimoto | 310/71 |
| 4,734,548 | 3/1988 | Cole | 200/38 R |

*Primary Examiner*—J. R. Scott

*Attorney, Agent, or Firm*—Sughrue, Mion, Zinn, Macpeak & Seas

[57] ABSTRACT

A motor-driven time switch is disclosed which comprises a time switch mechanism having a time setting cam, leaf spring contacts forming a switching unit operated by the time setting cam, and terminals for connecting the leaf spring contacts to external equipment and a motor for rotating the cam. Terminal pin mounting parts are formed on the coil bobbin of the motor. The end portions of the wire forming the coil of the motor are wound on terminal pins press-fitted into the terminal pin mounting parts. The terminal pins are connected to the aforementioned terminals.

9 Claims, 2 Drawing Sheets

MOTOR-DRIVEN TIME SWITCH

BACKGROUND OF THE INVENTION

This invention relates to a motor-driven time switch.

In a conventional motor-driven time switch, in order to supply current to the coil winding of the motor, lead wires are connected to the ends of the coil windings, and the lead wires thus connected are laid outside the casing so that they are connected to the terminals of the time switch.

Accordingly, it is necessary to connect the lead wires to the ends of the coil winding and the terminals, for instance, by soldering. Therefore, the conventional motor-driven time switch can be assembled by only persons skilled in the art; that is, it is low in work efficiency. Furthermore, since the lead wires are laid outside the casing, they may be disconnected or cut by being jerked or caught, for instance, by the hand or the assembling tools.

SUMMARY OF THE INVENTION

Accordingly, an object of this invention is to eliminate the above-described difficulties accompanying a conventional motor-driven time switch.

More specifically, an object of the invention is to provide a motor-driven time switch in which the time switch mechanism and the electric motor can be readily combined together; that is, the assembling work is achieved with high efficiency, and the probability of the lead wires being broken is decreased.

The foregoing object and other objects of the invention have been achieved by the provision of a motor-driven time switch comprising: a time switch mechanism including a time setting cam, a plurality of leaf spring contacts forming switching means operated by rotation of the time setting cam, and a plurality of terminals for connecting the leaf spring contacts to external equipment; and an electric motor with a coil for rotating the time setting cam, which, according to the invention, comprises: a coil bobbin on which the coil is wound, the coil bobbin having a plurality of terminal pin mounting parts; and terminal pins which are press-fitted in terminal pin mounting parts selected out of the plurality of terminal pin mounting parts, and connected to terminals selected out of the plurality of terminals, both ends of the coil being wound on the terminal pins thus press-fitted.

The nature, principle and utility of the invention will become more apparent from the following detailed description when read in conjunction with the accompanying drawings.

DETAILED DESCRIPTION OF THE INVENTION

One preferred embodiment of this invention will be described with reference to the accompanying drawings.

Figure 1:
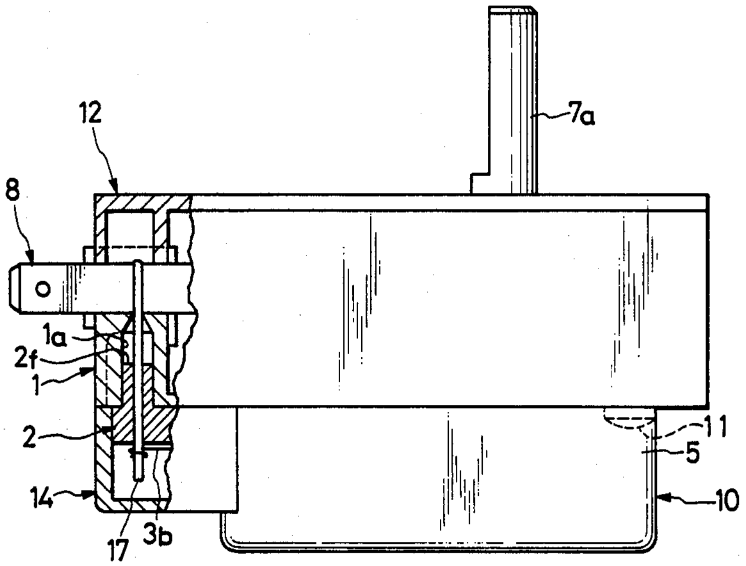
FIG. 1 is a side view, with parts cut away, showing one example of a motor-driven time switch according to this invention.
Figure 2:
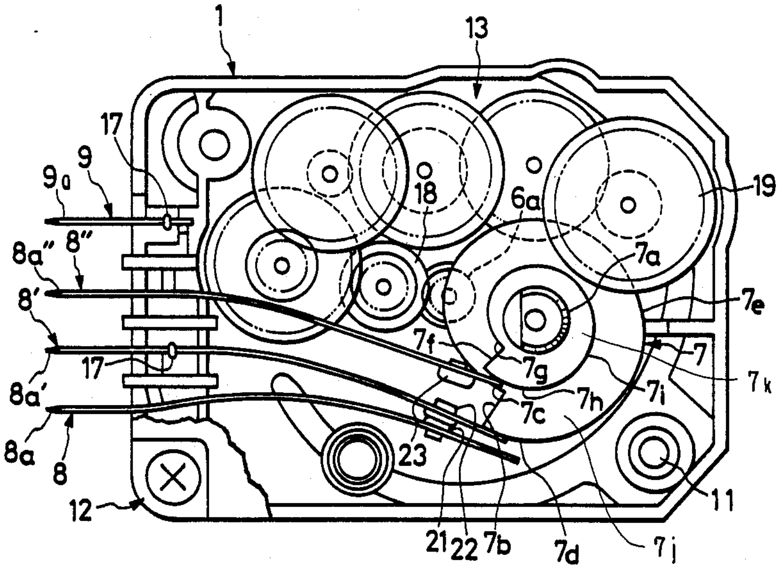
FIG. 2 is a sectional plan view of the motordriven time switch shown in FIG. 1.

A motor-driven time switch of the invention, as shown in FIGS. 1 and 2, comprises: an electric motor 10 secured to a casing 1 with screws 11; and a time switch mechanism 13 disposed between the casing 1 and its cover 12.

Figure 3:
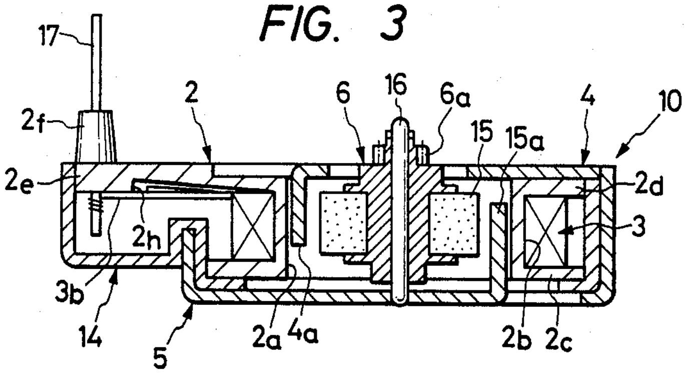
FIG. 3 is a sectional side view of an electric motor in the motor-driven time switch according to the invention.

The motor 10, as shown in FIG. 3, comprises: a coil bobbin 2 on which a coil 3 is wound, a bobbin cover 14 engaged with the coil bobbin 2 at its one side; a yoke 4 having comb-shaped pole teeth 4*a;* and a motor casing 5 having comb-shaped pole teeth 5*a*. The yoke 4 and the motor casing 5 are arranged on both sides of the coil bobbin 2 engaged with the bobbin cover 14 in such a manner that the pole teeth 4*a* and 5*a* are inserted into the central hole 2*a* of the coil bobbin 2. A rotor 6 with permanent magnets 15 formed outside is rotatably supported in the circle formed by the pole teeth 4*a* and 5*a* with its shaft 16 as the axis of rotation. FIG. 3 is a sectional view of the motor taken along line III—III in FIG. 4.

Figure 4:
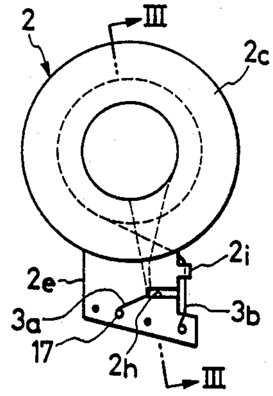
FIG. 4 is a plan view of a coil bobbin in the electric motor shown in FIG. 3 wherein section line III—III is the line along which the sectional side view of FIG. 3 has been taken.
Figure 5A:
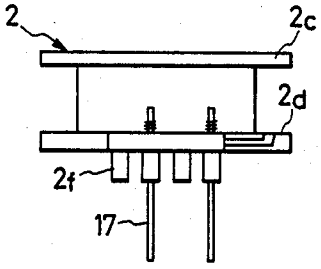
FIGS. 5(*a*) and 5(*b*) are side views of the coil bobbin, showing different arrangements of terminal pins.
Figure 5B:
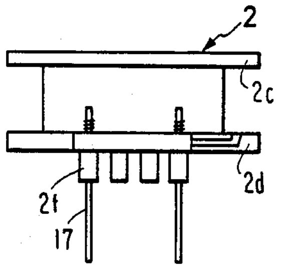

The coil bobbin 2, as shown in FIGS. 3, 4 and 5, comprises: a cylindrical coil-winding part 2*b;* flanges 2*c* and 2*d* on both ends of the coil-winding parts 2*b;* a flange protrusion 2*e* extended radially from the flange 2*d;* and a plurality of terminal pin mounting parts (terminal pin holders) 2*f.* The terminal pin mounting parts 2*f* are formed on the outer end of flange protrusion 2*e* in such a manner that they are extended along the axis of the coil bobbin 2. The flange protrusion 2*e* has a guide groove 2*h* in which one end portion of the wire of the coil 3 is inserted, and a projection 2*i* with which the other end portion of the wire is engaged.

The terminal pin mounting parts 2*f* have through-holes extended along the central axis, into which terminal pins 17 are press-fitted. The coil winding end portions 3*a* and 3*b* are soldered to the first end portions of the terminal pins 17.

Figure 6:
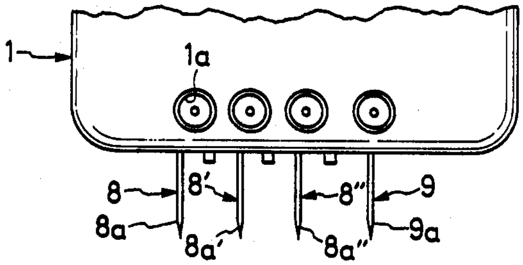
FIG. 6 is a plan view showing essential parts of a casing.

As shown in FIGS. 1 and 6, guide holes 1*a* are formed in the casing 1, to receive the above-described terminal pin mounting parts 2*f.*

The time switch mechanism 13 is accommodated in the casing 1 with the cover 12, as was described above. The output gear 6*a* of the rotor 6 is engaged with the input gear 18 of a gear train. The output gear 19 of the gear train is engaged with a gear (not shown) which is integral with a time setting cam 7. The time setting cam 7 may be integral with a main shaft 7*a,* or it may be fixedly secured with the main shaft 7*a* which is formed separately. The time setting cam 7 is made up of two cams, namely, a large cam 7*j* and a small cam 7*k.* The large cam 7; has a step 7*b,* a low cam surface 7*c,* a high cam surface 7*d,* and an envelope surface 7*e* formed by gradually increasing a rotating radius. The end portions of leaf spring contacts 8 and 8′ are abutted against the large cam $7j$. The small cam $7k$, being substantially similar in configuration to the large cam $7j$, has a step $7f$, a low cam surface $7g$, a high cam surface $7h$, and an envelope surface $7i$ formed by gradually increasing a rotating radius. The end portion of a leaf spring contact 8″ is abutted against the small cam $7k$. The terminals 8a, $8a'$ and $8a''$ of the leaf spring contacts 8, 8′0 and 8″, and the terminal $9a$ of a common leaf spring contact 9 are inserted in grooves formed in the casing 1, and are fixedly secured by means of the cover 12. Contacts 21, 22 and 23 are fixedly provided on the other end portion of the leaf spring contacts 8, 8′ and 8″, respectively.

Figure 7:
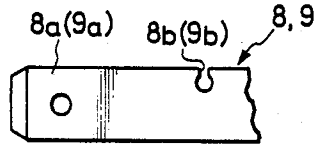
FIG. 7 is a side view showing essential parts of the terminal of a contact board.
Figure 8:
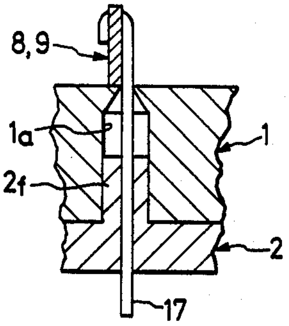
FIG. 8 is a sectional front view showing essential parts of the terminal of the contact board and a terminal pin mounting part.

The above-described guide holes $1a$ are formed in the casing 1 in such a manner that they confront with the terminals $8a$, $8a'$, $8a''$ and $9a$, respectively, and, when the terminal pin mounting parts $2f$ are inserted into the guide hole $1a$ with the motor 10 secured to the casing 1, the terminal pins 17 are positioned beside the terminals $8a$, $8a'$, $8a''$ and $9a$. As shown in FIG. 7, inverted-Ω(ohm)-shaped terminal pin press-fitting grooves $8b$ and $9b$ are formed in the leaf spring contact 8, 8′, 8″ and 9. The terminal pins 17 are press-fitted in the grooves $8b$ and $9b$ as shown in FIG. 1 and 8.

FIG. 2 shows the motor-driven time switch in which the motor 10 with the coil bobbin 2 shown in the part (a) of FIG. 5 is combined with the casing 1 accommodating the time switch mechanism 2.

The configuration of the time setting cam 7 is not limited to that shown in FIG. 2. The number and the configuration of the leaf spring contacts are not limited to those shown.

Of the terminal pin mounting parts $2f$ of the coil bobbin 2, those which should receive the terminal pins 17 should be selected according to the function of the time switch mechanism and the operation of external equipment connected thereto. This will be described in more detail. In order that the motor is operated in correspondence to the function of the time switch mechanism or the operation of the external equipment connected thereto, the terminal pins 17 are press-fitted in the terminal pin mounting parts $2f$ selected, and are then connected to the two ends of the coil winding. If the motor 10 with the coil bobbin 2 shown in FIG. 5($b$) is secured to the casing 1, and then the terminal pins 17 are fixedly coupled to the terminals $8a$ and $9a$ of the leaf spring contacts 8 and 9, then a time switch different from the above-described one can be obtained.

As is apparent from the above description, the selective use of the terminal pin mounting parts permits the motor-driven time switch of the invention to operate for a variety of circuits.

The motor-driven time switch thus constructed provides the following advantages: First, the soldering work is unnecessary. The coil winding end portions $3a$ and $3b$ can readily be connected to the terminal pins 17; that is, the work efficiency is improved as much. Furthermore, since the coil winding end portions $3a$ and $3b$ are connected to the terminal pins 17 inside the casing 1 and the motor casing 5, a difficulty of the coil wire being broken is substantially eliminated.

By changing the combination of the terminal pins 17 of the motor 10 and the terminals $8a$, $8a'$, $8a''$ and $9a$ of the leaf spring contacts 8, 8′, 8″ and 9, a variety of time switches different in operation can be obtained. As was described above, in the motor-driven time switch of the invention, a plurality of terminal pin mounting parts $2f$ are provided, and the guide holes $1a$ are formed in the casing 1 of the time switch mechanism 13 in such a manner that they can receive the terminal pin mounting parts $2f$, respectively. Therefore, if the terminal pin mounting parts $2f$ are so selected that the motor 10 operates suitable for a given operating circuit and the terminal pins 17 are press-fitted in the terminal pin mounting parts $2f$ thus selected, then a time switch suitable for the operating circuit can be formed. That is, a variety of motor-driven time switches can be obtained by changing the combination of the terminal pins 17 and the terminal pins mounting parts $2f$.

As is apparent from the above-description, a variety of motor-driven time switches can be manufactured with only one kind of casing 1 for the time switch mechanism 13. That is, the number of components is not increased, and the assembling efficiency is improved.

The motor-driven time switch of the invention is constructed as described above. Therefore, it can be assembled without soldering work. The terminals of the coil can readily be connected to the terminal pins; that is, the work efficiency is improved. Furthermore, since the ends of the coil are connected to the terminal pins only inside the housing, the lead wires will never come out of the housing, and accordingly a danger of the coil wire being broken is substantially eliminated. Thus, the motor-driven time switch of the invention should be highly appreciated in practical use.

We claim:

1. A motor-driven time switch including a time switch mechanism comprising a time setting cam, switching means having a plurality of leaf spring contacts operated by rotation of said time setting cam, and a plurality of terminals extending externally from said time switch mechanism for connecting said leaf spring contacts to external equipment; and electric motor means for rotating said time setting cam, said electric motor means comprising:
   - a coil bobbin having a plurality of terminal pin holders;
   - a coil wound around said coil bobbin; and
   - terminal pins which are press-fitted in selected ones of said plurality of terminal pin holders, and extending away from said bobbin for slidable insertion into contact with selected ones of said plurality of terminals.

2. A motor-driven time switch as claimed in claim 1, further comprising:
   - a time switch casing containing said time switch mechanism;
   - means for securing said electric motor to the outside of said time switch casing; and
   - a plurality of guide holes formed in said casing;
   - wherein said terminal pin holders are inserted in said guide holes and said terminal pins are positioned beside said leaf spring contacts.

3. A motor-driven time switch as claimed in claim 2, wherein said terminal pin holders are protrusions extending from said motor toward said time switch mechanism and said motor is secured to the outside of said casing so that said motor is positioned under said time switch mechanism and said terminal pin holders are engaged with said guide holes.

4. A motor-driven time switch as claimed in claim 2, wherein said terminal pin holders have central through-holes for receiving said terminal pins, and said terminal pins inserted into said central through-holes have one end on which the end portions of the wire forming said coil are wound, and another end on which selected leaf spring contacts are connected.

5. A motor-driven time switch as claimed in claim 2, wherein the number of said guide holes formed in said casing is equal to the number of said terminal pin holders, and said terminal pin holders in which said terminal pins are press-fitted are selected according to an operating circuit which is controlled by said time switch mechanism.

6. A motor-driven time switch as claimed in claim 2, wherein each of said leaf spring contacts has an inverted-Ω-(ohm)-shaped terminal pin groove, each terminal pin being press-fitted in the groove of a respective leaf spring contact so that each terminal pin is fixedly connected to it's respective leaf spring contact.

7. A motor-driven time switch as claimed in claim 5, wherein the number of said terminal pin holders is at least three, the number of said guide holes is also at least three, and the number of said terminal pins inserted into said terminal pin holders is two.

8. A motor-driven time switch as claimed in claim 1, wherein said terminal pins extend in an axial direction from an end face of said bobbin.

9. A motor-driven time switch as claimed in claim 1, wherein each end of said coil is wound around a respective one of said terminal pins.

* * * * *